United States Patent
Win et al.

(10) Patent No.: US 8,837,035 B2
(45) Date of Patent: Sep. 16, 2014

(54) ELECTRO-WETTING TRANSMISSIVE AND INTERFERENCE DISPLAY DEVICE WITH ADJUSTABLE FUNCTION

(71) Applicant: National Tsing Hua University, Hsinchu (TW)

(72) Inventors: Jux Win, Jebei (TW); Wei-Leun Fang, Hsinchu (TW); Cheng-Yao Lo, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/733,344

(22) Filed: Jan. 3, 2013

(65) Prior Publication Data
US 2014/0043670 A1    Feb. 13, 2014

(30) Foreign Application Priority Data
Aug. 13, 2012    (TW) .............................. 101129211 A

(51) Int. Cl.
*G02B 26/00*    (2006.01)
*G02B 26/02*    (2006.01)

(52) U.S. Cl.
CPC .............. *G02B 26/005* (2013.01); *G02B 26/00* (2013.01); *G02B 26/02* (2013.01)
USPC .......................................................... 359/290

(58) Field of Classification Search
CPC .. G02B 26/005; G02B 26/004; G09G 3/3433; G09G 2300/0426
USPC ................. 359/245, 228, 253, 315, 318, 665; 359/290–292; 345/41, 48, 60, 84, 204; 349/1, 12
See application file for complete search history.

(56) References Cited

U.S. PATENT DOCUMENTS 7,595,925 B2 *    9/2009    Valette et al. ................. 359/290

* cited by examiner

*Primary Examiner* — Tuyen Tra
(74) *Attorney, Agent, or Firm* — Birch, Stewart, Kolasch & Birch, LLP

(57) ABSTRACT

An electro-wetting transmissive and interference display device with adjustable function includes a lower electrode, an upper electrode and an droplet disposed between the upper electrode and the lower electrode, wherein the lower electrode, the droplet and the upper electrode are disposed on a substrate, and the droplet is enclosed between the lower electrode and the upper electrode by an ink jet printing method.

9 Claims, 1 Drawing Sheet

ELECTRO-WETTING TRANSMISSIVE AND INTERFERENCE DISPLAY DEVICE WITH ADJUSTABLE FUNCTION

BACKGROUND OF THE INVENTION

1. Field of the Invention

The present invention relates to a display device, and more particularly to an electro-wetting transmissive and interference display device with adjustable function.

2. Description of Related Art

Although the existing liquid crystal display (LCD) is the mainstream display, its drawback is that the light utilization efficiency is very low, and final transmitted light is only 5% of the light source. Furthermore, the electrophoresis technology usually used in display is also difficult to achieve a full-color application by operation restriction.

Other related technologies, such as the potential iMOD, utilize the light source to incident the component area and reflect again to display a specific image. This is a reflective type display technology. In the prior art, utilizing the interference display technology to produce the color is to adjust the thickness of the structure to change the wavelength of the output light in order to control the color rendering. However, in the high contrast ratio situation, it must add the black pigment doping to achieve a better performance. The process is more complicated and less flexible and/or affects the resolution.

In addition, the electro-wetting technology is a display technology that applies different voltages such that the insulating film is changed from hydrophobic to hydrophilic. The electro-wetting technology has advantages of full color display and dynamic display so that it is an important technology at future optical communication and display device.

SUMMARY OF THE INVENTION

The technical problem solved by the present invention is to utilize a transparent thin film material to form an electro-wetting transmissive and interference display device with adjustable function having a regional thickness which is adjustable by the applied voltage to provide various interferometric wavelengths.

In order to achieve the above purpose, the present invention comprises: an electro-wetting transmissive and interference display device with adjustable function comprising:

a lower electrode;

an upper electrode; and a droplet disposed between the lower electrode and the upper electrode;

wherein the lower electrode, the droplet, and the upper electrode are disposed on a substrate, and the droplet is enclosed between the lower electrode and the upper electrode by an ink jet printing method.

Wherein, the lower electrode and the upper electrode have a preset pattern.

Wherein, the substrate is a glass.

Wherein, the substrate is a polymer film.

Wherein, the polymer film is transparent.

Wherein, the lower electrode and the upper electrode are all made of metal thin films to function as conductors and an interference cavity. The area of the electrode can determine the volume of a sphere according to the subsequent reflow and also provides a self-aligned base for the polymer droplet so that the process is simpler.

The electro-wetting transmissive and interference display device with adjustable function utilizing the above technology content. Because the lower electrode, the droplet and the upper electrode are disposed on a substrate, and the droplet is an electro-wetting droplet, and the droplet is enclosed between the lower electrode and the upper electrode by an ink jet printing method, a pixel formed by the upper electrode, the lower electrode and the droplet can be designed in various shapes according to the lower electrode and the upper electrode to achieve various effects and purposes. In an optical application, the transmission range can be selected to achieve a better pattern effect and energy saving. By adjusting the thickness of the structure, the wavelength of the transmitted light can fall within a certain range such that the manufacturing process is simpler to achieve the high resolution display effect. The lower electrode can change pattern according to the design of the pixel or connect multiple pixels to become a regional and fixed pattern. The size of the pattern can be adjusted according to the resolution.

DETAILED DESCRIPTION OF THE PREFERRED EMBODIMENT

To have a better understanding and awareness of the effects and the structural features of the present invention, the following combines the embodiments and figures for detailed description.

Figure 1:
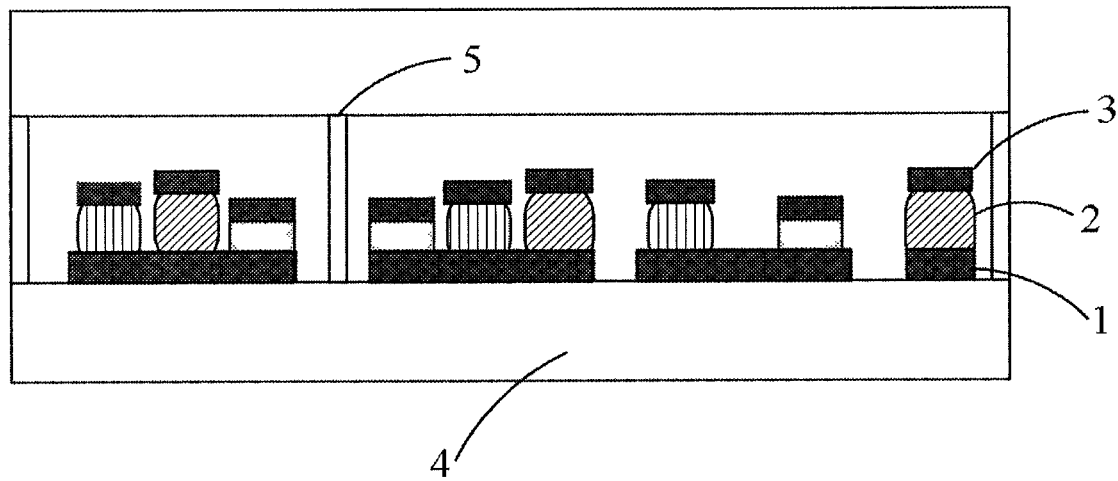
FIG. 1 is a schematic structural diagram of the electro-wetting transmissive and interference display device with adjustable function of the present invention.
Figure 2:
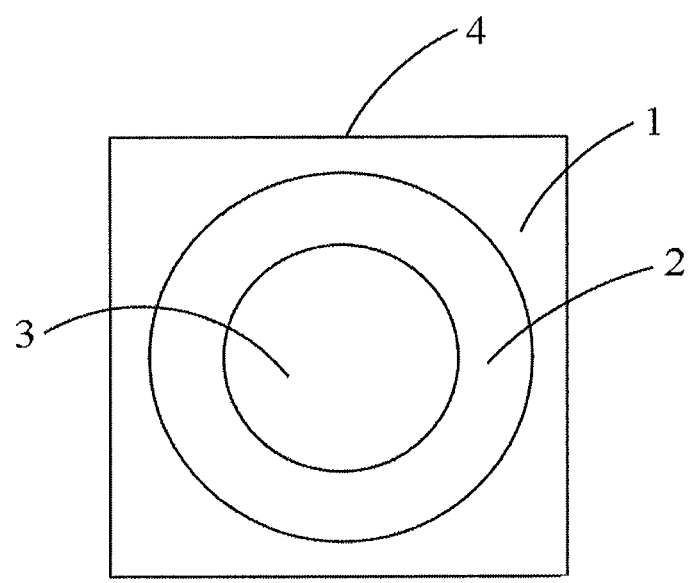
FIG. 2 is a top schematic structural view of the electro-wetting transmissive and interference display device with adjustable function of the present.

With reference to FIG. 1 and FIG. 2, the electro-wetting transmissive and interference display device with adjustable function of the present invention includes a lower electrode 1, an upper electrode 3, and a droplet 2 disposed between the lower electrode 1 and the upper electrode 3. The lower electrode 1, the droplet 2 and the upper electrode 3 are disposed on a substrate 4, wherein the distance of the lower electrode 1 and the upper electrode 3 (i.e., the thickness of the structure) can be changed by changing the attractive and/or repulsive forces between the lower electrode 1 and the upper electrode 3 through an IC matrix with electronic control.

The droplet 2 comprises an electro-wetting droplet that can change its physical property according to the thickness and electric field between the upper electrode 3 and the lower electrode 1. The electro-wetting droplet which can affect the wavelength of light passing through it can be enclosed on the droplet 2 by an ink jet printing method, and a pixel formed by the upper electrode 3, the lower electrode 1 and the droplet 2 can be designed in various shapes according to the lower electrode 1 and the upper electrode 3 to achieve various effects and purposes. In an optical application, the transmission range can be selected to achieve a better pattern effect and energy saving. By adjusting the thickness of the structure, the wavelength of the transmitted light can fall within a certain range such that the manufacturing process is simpler to achieve the high resolution display effect.

The lower electrode 1 can change pattern according to the design of the pixel or connect multiple pixels to become a regional and fixed pattern. The size of the pattern can be adjusted according to the resolution. The lower electrode 1 and the upper electrode 3 have a preset pattern. The substrate 4 may be a glass or a transparent polymer film.

The upper electrode 3 and the lower electrode 1 are all made of the metal thin film to function as conductors and an interference cavity. The area of the electrode can determine the volume of a sphere according to the subsequent reflow and also provides a self-aligned base for the polymer droplet so that the process is simpler.

The multiple lower electrodes, the multiple upper electrodes and the multiple droplets disposed between the lower electrodes and the upper electrodes can be classified into different groups respectively depending on display content or other requirements. The different groups of the lower electrodes, the upper electrode and the droplets disposed between the lower electrodes and the upper electrodes can be separated by at least a partition wall 5. In addition to separation function, the partition wall 5 also strengthens the overall structure of the display device.

The present invention utilizes a transparent film material to form a full color display device having a regional thickness which is adjustable by the applied voltages to provide various interferometric wavelengths. By interference principle, it easily gets a full color output through the various thickness of the structure. Because it is belonging to the transmissive display technology, it is more suitable for very large display. Furthermore, it can utilize the natural light as a background light source, and it is thinner and flexible structure and can be applied in a variety of demanding environments.

The operation principle of the present invention is utilizing micro amount of the transparent electro-wetting material to change the thickness through the hydrophilic or hydrophobic phenomenon between the upper and lower electrode to provide various interferometric wavelengths of lights, and then mixing the lights to form a full color image. The mechanical protection of the structure is utilizing the glass or the polymer film, and the glass or the polymer film also provide ultraviolet (UV) and infrared (IR) filter functions.

The thickness of each of the different groups of the lower electrodes, the upper electrode and the droplets of the initial structure can be designed to make the wavelength of the transmitted light fall within a certain range, for example, the wavelength is outside the human visible light range. Therefore, when in the non-operation condition, the display device is full black so that the process is relatively simple to achieve a higher resolution display.

The present invention also has a flexible characteristic, and easy to carry and reduce size. The manufacturing cost is also very low to be suitable for disposable advertising reel application. The liquid electro-wetting material will not deform due to the curl of the display device, and will not result in the mechanical destruction or optical mutation problems caused by mechanical assembled device. In the non-color display condition, it can apply the voltages to adjust the grayscale or bright and dark (on/off).

In the color display condition, it conducts the electricity to operate to achieve power saving and higher contrast ratio and higher contrast, suitable for a variety of display applications. The light sources could be full gamut natural light or artificial light sources such as LED light sources, and it can also be displayed at double sides.

The present invention utilizes the electro-wetting technology to adjust the interferometric wavelength to achieve the effect of the full-color imaging; it can replace the existing windows or the large screen display to achieve dimming, beautification, video playing, or advertising effect.

The present invention utilizes transmissive and interference type display device having static and dynamic features. In non-color display condition, it utilizes voltages to adjust grayscale or bright and dark. In the color display condition, it conducts the electricity to operate to achieve power saving and higher contrast ratio and higher contrast, suitable for a variety of applications such as a color curtain display screen, a glass murals, an outdoor advertising wall, and the indoor application including interactive electronic whiteboards and conference video.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. An electro-wetting transmissive and interference display device with adjustable function comprising:
    a lower electrode;
    an upper electrode; and
    an electro-wetting droplet disposed between the lower electrode and the upper electrode; wherein the lower electrode, the electro-wetting droplet and the upper electrode are disposed on a substrate, and the electro-wetting droplet is enclosed between and in direct contact with the lower electrode and the upper electrode.

2. The electro-wetting transmissive and interference display device with adjustable function according to claim 1, wherein, the lower electrode and the upper electrode have a preset pattern.

3. The electro-wetting transmissive and interference display device with adjustable function according to claim 1, wherein, the substrate is a glass.

4. The electro-wetting transmissive and interference display device with adjustable function according to claim 1, wherein, the substrate is a polymer film.

5. The electro-wetting transmissive and interference display device with adjustable function according to claim 1, wherein, the lower electrode and the upper electrode are all made of metal thin films.

6. The electro-wetting transmissive and interference display device with adjustable function according to claim 1, wherein, the display device comprises multiple groups of the lower electrodes, the upper electrodes and the electro-wetting droplets disposed between the lower electrodes and the upper electrodes, and the multiple groups are separated by at least a partition wall.

7. The electro-wetting transmissive and interference display device with adjustable function according to claim 1, wherein the upper electrode is entirely located above the electro-wetting droplet that is disposed between and in direct contact with the lower electrode and the upper electrode.

8. The electro-wetting transmissive and interference display device with adjustable function according to claim 1, further comprising:
    a second lower electrode; and
    a second electro-wetting droplet disposed between and in direct contact with the second lower electrode and the same upper electrode,
    wherein the electro-wetting droplet and the second electro-wetting droplet are space apart from each other.

9. The electro-wetting transmissive and interference display device with adjustable function according to claim 1, further comprising:
    a second lower electrode;
    a second upper electrode; and
    a second electro-wetting droplet disposed between and in direct contact with the second lower electrode and the second upper electrode, wherein the lower electrode and the second lower electrode are two immediately adjacent lower electrodes, and the electro-wetting droplet and the second electro-wetting droplet are space apart from each other.

* * * * *